Patented June 8, 1954

2,680,738

UNITED STATES PATENT OFFICE 2,680,738

PREPARATION OF ALKALI CELLULOSE

Kenneth C. Laughlin, Wilmington, Del., assignor to Hercules Powder Company, Wilmington, Del., a corporation of Delaware No Drawing. Application April 11, 1952, Serial No. 281,893

6 Claims. (Cl. 260—233)

This invention relates to an improved process for producing alkali cellulose by a slurry process. In a specific aspect this invention relates to a process for producing alkali-soluble and water-soluble cellulose ethers wherein alkali cellulose, produced by an improved slurry process, is an intermediate product.

Heretofore alkali cellulose, as an intermediate in the preparation of cellulose ethers, has been prepared by a variety of procedures. Generally, these processes have been deficient in economy and/or have resulted in alkali cellulose of poor uniformity and poor quality. Prior art methods involving steeping and pressing procedures for the preparation of alkali cellulose have been wasteful because the alkali cellulose prepared in this way retains far more caustic alkali and water than is required for economic preparation of many alkali-soluble and water-soluble cellulose ethers. Various dough-mixing and dry-mixing procedures have been proposed to overcome the inherent shortcomings of steeping processes. These have not led to desired uniformity because the small amounts of caustic alkali and water required for economic preparation of alkali-soluble and water-soluble cellulose ethers cannot be uniformly distributed on the cellulose by dough-mixing or dry-mixing procedures. Slurry processes involving the use of insert water-immiscible diluents also invariably lead to products of poor uniformity and low reagent efficiency because the caustic alkali and water cannot be uniformly distributed on the cellulose in the presence of such diluents. Moreover, such slurry processes have always been handicapped by the presence of matted agglomerates of cellulose fibers or particles even at low concentrations of cellulose in the slurry, and it has not been possible to obtain a uniform distribution of caustic alkali and water on the cellulose because these matted agglomerates could not be satisfactorily dispersed.

A uniform alkali cellulose suitable for the preparation of various alkali-soluble and water-soluble cellulose ethers has been prepared by a slurry procedure which involves the formation of a slurry of comminuted cellulose in a medium of the group consisting of the aliphatic alcohols containing from 2 to 5 carbon atoms per molecule, dioxane, tetrahydrofuran and mixtures thereof. To this slurry is added the required amount of caustic alkali and water, preferably in the form of an aqueous solution, and the resulting reaction mixture is agitated for a period of time. The time required to add the alkali and water to the slurry and to agitate the reaction mixture is generally in excess of one hour or more in order to produce a suitably substituted uniform alkali cellulose.

It is an object of this invention to provide a novel slurry process for producing alkali cellulose.

It is a further object of this invention to provide an improved process for producing alkali cellulose by a slurry process at a contact time shorter than that heretofore employed.

It is another object of this invention to provide a novel and improved process for producing sodium cellulose.

It is a further object of this invention to provide a novel process for producing cellulose ethers wherein alkali cellulose is an intermediate product.

It is another object of this invention to provide a novel and improved process for producing sodium carboxymethylcellulose.

Further and additional objects of this invention will be apparent from the disclosure hereinbelow.

It has been found that alkali cellulose, for example, sodium cellulose, can be prepared by a novel and improved slurry process wherein a slurry containing cellulose and an aqueous caustic alkali solution are contacted for shorter periods of time than prior art procedures have employed. In practicing this invention the slurry containing the cellulose and the aqueous caustic alkali solution are introduced to a reaction zone in a manner and at rates such that the ratio of caustic alkali to cellulose in the reaction zone is maintained within the range of 0.2 to 1.8 parts of caustic alkali per part of cellulose. The resulting alkali cellulose, which is produced at reactant contact times generally not in excess of 15 minutes, and usually within the range of 3 to 15 minutes, is useful in the production of alkali-soluble and water-soluble cellulose derivatives.

The objects, advantages and utility of this invention are apparent from the following specific examples.

Examples

In a series of runs a slurry, having a 6.25% concentration, was formed of 15 parts of 87% (by volume) isopropanol and 1 part of wood pulp cut to pass through an 80-mesh screen in a 40-gallon agitated kettle. The slurry was pumped to an agitated, open-head, 1-gallon kettle having an overflow weir simultaneously with a 44% sodium hydroxide solution. The flow rates and weir level determined the nominal holdup time. In some of the runs the reaction mixture was passed or cascaded through a series of 2 or 3 of such reaction kettles, and in the table below this is shown as the number of alkali cellulose stages. The mole ratio of sodium hydroxide to cellulose was 2:1 (weight ratio 0.5:1), and the weight ratio of water to cellulose was 2.5:1. The reaction between the sodium hydroxide and cellulose was carried out at room temperature.

The reaction effluent was passed to another agitated 1-gallon kettle having an overflow weir and a solution of monochloracetic acid (MCA) in 87% isopropanol, having a weight ratio of monochloracetic acid to isopropanol of 1.25, was metered into the second kettle. The resulting mixture was then passed to a 40-gallon, agitated, oil-jacketed, reaction kettle, and samples of this mixture were allowed to react batchwise under conditions which normally yield a good quality product when the alkali cellulose is prepared batchwise. In some of the runs, the monochloracetic acid addition was made batchwise to a grab sample of alkali cellulose made in one to three stages. In all etherification reactions a mole ratio of monochloracetic acid to cellulose of 1:1 (0.58 by weight) was used, and the mole ratio of sodium hydroxide to monochloracetic acid was 2:1. A reactant contact time of 2.5 hours at 65° C. to 70° C. was employed.

The carboxymethylcellulose product from these runs utilizing continuous alkali cellulose with batch or continuous addition of monochloracetic acid and batch etherification was washed with methanol and dried for 12 hours at 65° C. The product was analyzed for degree of substitution (D. S.), and a fiber count of a 2% water solution of each product was made by comparison with standard samples. The fiber count is an indication of product quality or uniformity of etherification, and the following quality ratings were used:

| Count | Quality |
|---|---|
| 1 | Excellent. |
| 2 | Good. |
| 3 | Acceptable. |
| 4 | Fair. |
| 5 | Poor. |

The pertinent data in the following table were observed:

| Run | Number of Alkali Cellulose Stages | Contact Time in Minutes in Alkali Cellulose Stages | MCA Addition | CMC Fiber Count | D. S. |
|---|---|---|---|---|---|
| 1 | 1 | 3 | Batch | 4− | 0.78 |
| 2 | 2 | 8 | do | 4 | 0.75 |
| 3 | 3 | 38 | do | 2−3 | 0.74 |
| 4 | 1 | 5 | do | 2 | 0.57 |
| 5 | 1 | 5 | Continuous | 2 | 0.76 |
| 6 | 3 | 8 | do | 3+ | 0.72 |

Alkali celluloses prepared in accordance with this invention can be employed to prepare various alkali-soluble and water-soluble cellulose ethers in addition to carboxymethylcellulose. Such ethers include by way of example hydroxyethyl cellulose, carboxyethyl cellulose, sulfoethyl cellulose, hydroxyethyl carboxymethyl cellulose, sulfoethyl hydroxyethyl cellulose, sulfoethyl carboxymethyl cellulose, cyanoethyl cellulose, and the like.

In forming the slurry of comminuted cellulose in accordance with this invention it is immaterial whether the slurrying medium is added to the cellulose or whether the cellulose is added to the slurrying medium, since either method of operation results in the formation of a satisfactory slurry. Preferably the two should be mixed together with agitation to effect uniform distribution of the cellulose throughout the slurrying medium, and the slurries are sufficiently fluid so that mixing is readily accomplished with any ordinary mixing means, such as paddle stirrers, turbo mixers, and the like, or by tumbling in a suitable vessel.

The comminuted cellulose employed to prepare the alkali cellulose generally has a particle size sufficiently small to pass through the openings in a standard 35-mesh sieve or screen. Particles having this degree of comminution have the characteristic of distributing themselves readily throughout the slurry as individual particles when agitated without any tendency to mat or felt together into agglomerates. Moreover, the comminuted particles of cellulose in accordance with this invention move relative to each other through the slurry upon simple stirring or agitation. This is surprising and unexpected, for fibers larger than about 35 mesh do not possess these desirable characteristics, for there is a marked tendency for such larger fibers to felt and mat together into agglomerates, and the individual particles cannot move freely relative to each other through the slurry upon stirring or agitation. There does not appear to be any lower limit with respect to fineness, for material in the micron size range is entirely suitable. In fact, the smaller the individual particles are, the higher the percentage by weight of cellulose which can be slurried satisfactorily in the slurrying media of this invention, up to the working limit of about 20% by weight in accordance with this invention.

The comminuted cellulose may be derived from any suitable and well-known source of cellulosic material, such as cotton, cotton linters, wood pulp, and the like. Comminution may be accomplished by any suitable comminution means, such as knife mills, hammer mills, ball mills, paper beaters, Jordan engines, attrition mills, and the like. Knife mills are preferred, however, over other means of comminution or attrition because knife mills tend to produce more uniform particles having clean-cut ends with a minimum amount of fibrillation, pinching or closing off of the ends of the comminuted particles, etc. Care must be exercised in comminuting the cellulose to avoid a harmful heat build-up which would tend to harm and degrade the cellulose. To this end it is advisable to provide adequate ventilation or other means of cooling the comminuting means.

The slurries of comminuted cellulose in accordance with this invention will contain up to about 20% by weight of cellulose, based on the combined weights of cellulose and slurrying medium, both calculated on a moisture-free basis. This has been found to be the practical upper working limit commensurate with ability to stir or agitate the slurry and readily obtain free movement of the individual cellulosic particles relative to each other through the slurry. It is obvious, of course, that as little as 0.5% by weight or even less comminuted cellulose in the slurry is fully operable. However, amounts much less than about 4.5% by weight of cellulose are not economically attractive. Preferred percentages of comminuted cellulose are between about 4.5% and about 13% by weight, for this range of cellulosic concentration in the slurry combines optimum conditions of ready workability together with attractive economy of reagents.

The slurrying medium in accordance with this invention is selected from the group consisting of the aliphatic alcohols having from 2 to 5 carbon atoms in the molecule, dioxane, tetrahydrofuran, and mixtures thereof. Any of the aliphatic alcohols having from 2 to 5 carbon atoms in the molecules are suitable in accordance with this invention and include by way of example ethyl alcohol, normal propanol, isopropanol, normal butanol, secondary butyl alcohol, isobutyl alcohol, tertiary butyl alcohol, methyl propyl carbinol, diethyl carbinol, methyl isopropyl carbinol, tertiary amyl alcohol, fusel oil, and the like. Preferred alcoholic media include isopropanol and tertiary butyl alcohol. It is a characteristic of these media that they all exhibit limited solubility for aqueous caustic alkali. It is believed that this feature is an important attribute of these media, contributing materially to the attainment of a uniform alkali cellulose.

The slurrying media in accordance with this invention may be anhydrous or may contain various amounts of water, as desired. For instance, it is often more practical and convenient to employ an azeotropic mixture of an alcohol and water rather than the anhydrous medium. Likewise, it is often more practical to employ a recovered slurrying medium from a previous alkali cellulose preparation directly without rectification. It is necessary, however, to know how much water is present in the slurrying medium in order to properly adjust the alkali cellulose system for required total water content.

The comminuted cellulose is contacted in the slurry with the required amount of caustic alkali and the required amount of water necessary for the preparation of the desired cellulose ether. This is an important feature of this invention for in this way an optimum alkali cellulose is prepared which will permit maximum efficiency of utilization of the etherifying agent and thereby effect a great economy in reagents. It has been found in accordance with this invention that the optimum alkali-to-cellulose ratio for the most efficient preparation of any alkali-soluble or water-soluble cellulose ether is within the range between about 0.2 part and about 1.8 parts for each part of cellulose, both being calculated on a moisture-free basis. Similarly, it has been found that the optimum water-to-cellulose ratio for the most efficient preparation of an alkali-soluble or water-soluble cellulose ether is within the range between about 0.5 part and about 8.0 parts of water for each part of cellulose in a moisture-free state. When these optimum alkali-to-cellulose and water-to-cellulose ratios are attained, there is a surprisingly increased efficiency of conversion of reagents in the subsequent etherification reaction. In arriving at the water-to-cellulose ratio, the total water added must be taken into consideration; that is, all water present in the slurrying medium, moisture in the cellulose, and water added with the alkali must be totaled with free water added per se to the system in order to arrive at the water-to-cellulose ratio.

The individual particles of comminuted cellulose are caused to move relative to each other through the slurry in the presence of the caustic alkali and the water. As set forth hereinbefore, this effects a uniform distribution of caustic alkali and water on the cellulose and forms in the medium a highly uniform alkali cellulose. In order to cause free movement of the cellulosic particles relative to each other through the slurry, and to effect uniform distribution of the caustic alkali and water on the cellulose requires agitation of the slurry throughout the process. This is readily accomplished by means of paddle stirrers, turbo mixers, and the like, or by tumbling in a suitable vessel.

It is desirable to maintain the temperature of the slurry at about room temperature or lower, for example, between about 0° C. and 30° C. throughout the process. This substantially eliminates harmful degradation of the alkali cellulose during preparation.

Various methods can be employed to contact the reactants in carrying out this invention. For example, the reactants for producing alkali cellulose can be metered simultaneously into either a single reaction vessel or the first of a plurality of reaction vessels where the reactants remain for a suitable contact time. These methods of contacting the reactants have been described in detail in the above examples. Alternatively, the slurry containing the cellulose and the aqueous caustic alkali solution can be metered simultaneously into and passed through a pipe line reactor, and the effluent therefrom is ready for use in the etherification reaction. If desired, the reactants can be contacted and at least a portion of the alkali cellulose can be produced in such a pipe line reactor prior to introduction of the reaction mixture to the single reaction vessel or plurality of reaction vessels described above. Any other suitable means can be used to contact the reactants within the scope of this invention.

It is an unusual feature of this invention that a uniform alkali cellulose can be produced at relatively short reaction times although relatively low temperatures generally not in excess of 30° C. are used. Thus, the process is particularly attractive because it makes possible reductions in reaction cycles, equipment investment and heat transfer requirements when compared with procedures employed heretofore.

The process in accordance with this invention provides highly uniform alkali cellulose substantially free of harmful degradation which at the same time is of optimum composition with respect to both alkali content and water content for optimum efficiency and economy of reagents upon conversion to cellulose ether. It makes possible the preparation of alkali cellulose of predetermined controlled alkali content and water content employing only the required amount of alkali and the required amount of water necessary for the preparation of the desired cellulose ether. There are the added advantages of reduced recovery of slurrying diluent and increased production capacity because more concentrated slurries are made possible through the use of comminuted cellulose of fine particle size. The process provides alkali cellulose in a highly desirable form and of a composition particularly suitable for preparation of alkali-soluble and water-soluble cellulose ethers of greatly improved uniformity and solubility characteristics as compared to the products of prior art processes. Additional advantages and modifications of the invention will be apparent to those skilled in the art from the above detailed disclosure.

What I claim and desire to protect by Letters Patent is:

1. A process for preparing uniformly substituted alkali cellulose which comprises forming a slurry of cellulose in a medium of the group consisting of the aliphatic alcohols having from 2 to 5 carbon atoms per molecule, dioxane, tetrahydrofuran, and mixtures thereof, simultaneously introducing resulting slurry and an aqueous solution of caustic alkali to a reaction vessel at a rate such that the ratio of caustic alkali to cellulose is maintained within the range of 0.2 to 1.8 parts of caustic alkali per part of cellulose, and the ratio of water to cellulose is maintained within the range of 0.5 to 8 parts of water per part of cellulose, and contacting said caustic alkali and cellulose while maintaining said ratios for a period of 3 to 15 minutes at a temperature not in excess of 30° C.

2. A process for preparing a uniformly substituted alkali cellulose which comprises forming a slurry of cellulose in a medium of the group consisting of the aliphatic alcohols having from 2 to 5 carbon atoms per molecule, dioxane, tetrahydrofuran, and mixtures thereof, simultaneously introducing resulting slurry and an aqueous solution of caustic alkali to a reaction vessel at a rate such that the ratio of caustic alkali to cellulose is maintained within the range of 0.2 to 1.8 parts of caustic alkali per part of cellulose, and the ratio of water to cellulose is maintained within the range of 0.5 to 8 parts of water per part of cellulose, and contacting said caustic alkali and cellulose while maintaining said ratios for a period of 3 to 15 minutes at a temperature within the range of 0° to 30° C.

3. A process according to claim 2 wherein the cellulose is comminuted to pass through a 35-mesh screen.

4. A process according to claim 2 wherein the slurry contains no more than 20% by weight of cellulose.

5. A process according to claim 2 wherein the slurrying medium is isopropanol.

6. A process according to claim 2 wherein the slurrying medium is tertiary butyl alcohol.

References Cited in the file of this patent

UNITED STATES PATENTS

| Number | Name | Date |
|---|---|---|
| 2,172,242 | Fordyce et al. | Sept. 5, 1939 |
| 2,517,577 | Klug et al. | Aug. 8, 1950 |
| 2,572,039 | Klug | Oct. 23, 1951 |
| 2,572,923 | Gaver | Oct. 30, 1951 |
| 2,580,351 | Grassie | Dec. 25, 1951 |
| 2,580,352 | Grassie | Dec. 25, 1951 |
| 2,602,084 | Gaver | July 1, 1952 |
| 2,609,368 | Gaver | Sept. 2, 1952 |

FOREIGN PATENTS

| Number | Country | Date |
|---|---|---|
| 543,301 | Great Britain | Feb. 18, 1942 |
| 637,134 | Great Britain | May 10, 1950 |